March 31, 1942. A. L. RODGERS 2,278,022
CATHEAD AND CLUTCHING DEVICE THEREFOR
Filed March 6, 1939 2 Sheets-Sheet 1
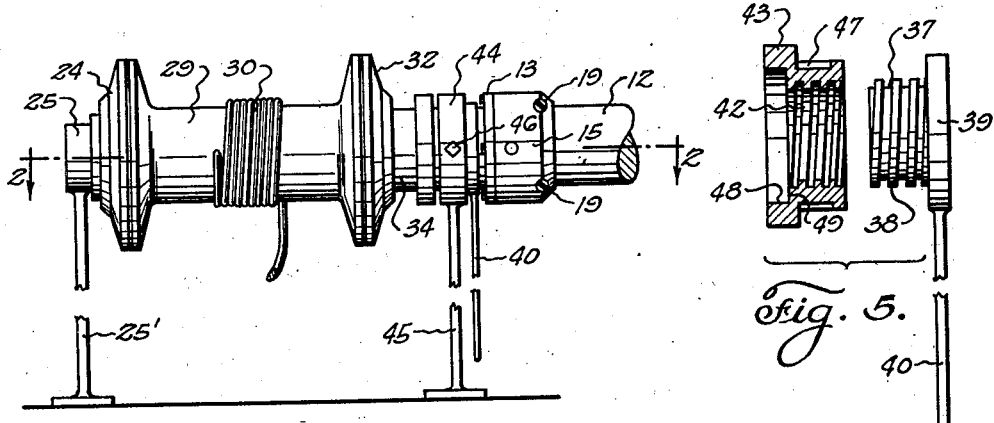
Fig. 1.
Fig. 5.
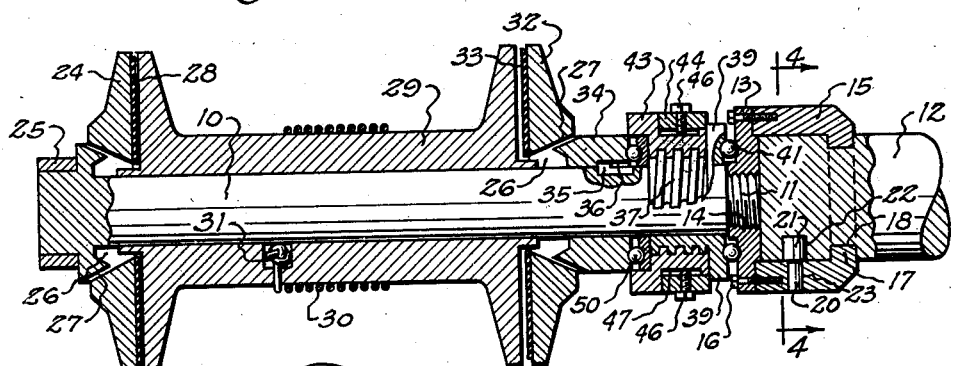
Fig. 2.
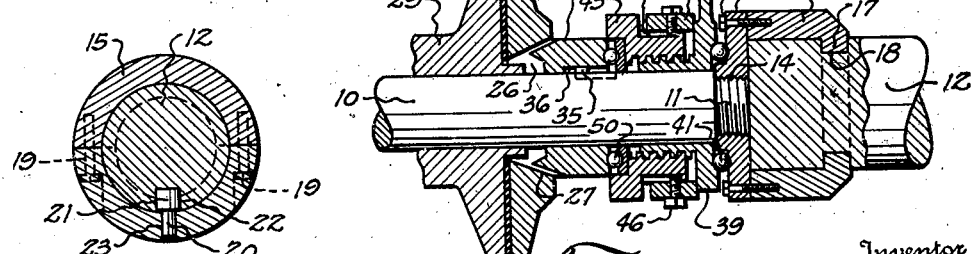
Fig. 4.
Fig. 3.
Inventor
Arthur L. Rodgers
Attorney March 31, 1942.    A. L. RODGERS    2,278,022
CATHEAD AND CLUTCHING DEVICE THEREFOR
Filed March 6, 1939    2 Sheets-Sheet 2
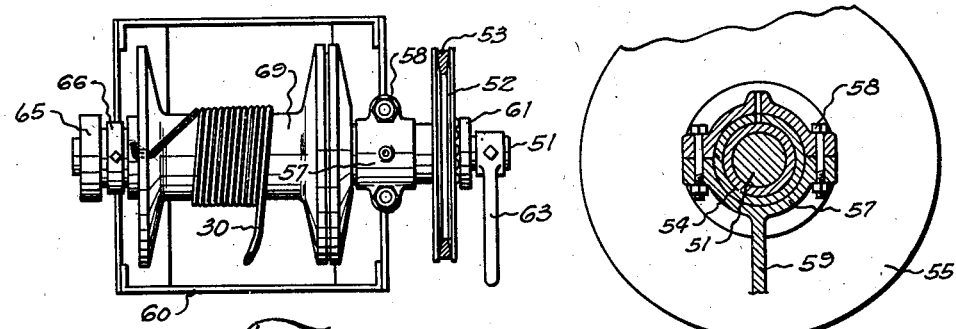
Fig. 7.   Fig. 9.
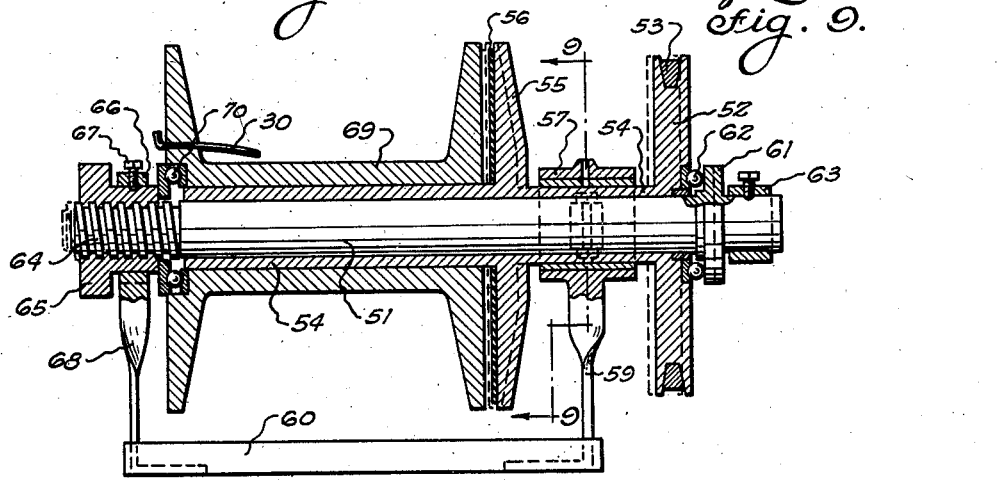
Fig. 8.
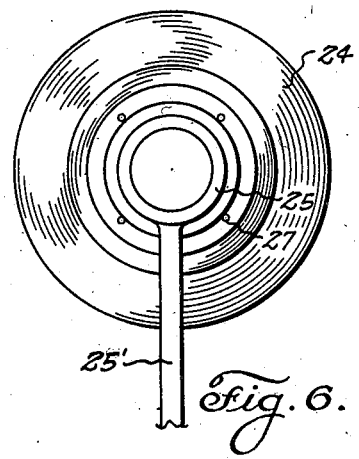
Fig. 6.
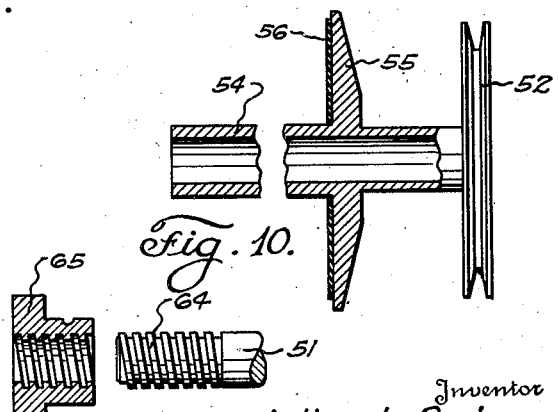
Fig. 10.
Fig. 11.
Inventor
Arthur L. Rodgers
By Jack A. Athey
Attorney Patented Mar. 31, 1942

2,278,022

UNITED STATES PATENT OFFICE 2,278,022

CATHEAD AND CLUTCHING DEVICE THEREFOR

Arthur L. Rodgers, Seagraves, Tex., assignor of one-half to Two States Drilling Company, Dallas, Tex., a corporation of Texas Application March 6, 1939, Serial No. 260,117

3 Claims. (Cl. 254—187)

This invention relates to new and useful improvements in catheads and clutching devices therefor.

As is well-known, hoisting and other devices including rotatable cable drums are widely used in the oil industry for various purposes and it is necessary that a positive control of such devices be had. One type of device which is commonly used is generally known as a "cathead," and, for the purposes of this description, will be described in connection with such device.

A cathead is an apparatus including a rotatable spool or drum about which a cable or line is arranged to be wound. The drum is ordinarily located adjacent the draw works and is connected thereto by a clutch mechanism, whereby rotation of said drum may be controlled. The cable or line on said drum is used for various purposes, one of which is the making or breaking of pipe joints, which is accomplished by wrapping the free end of the cable around the pipe and then rotating the drum or spool to cause the cable to be wound around said drum, thereby imparting a spinning or revolving motion to the pipe to which said free end is attached. The cathead line is relatively short and is employed for many other uses, which are familiar to those skilled in the art. Since the cathead is relatively light in construction, it is primarily used for the lighter work since the draw works drum is available for the heavier work.

One object of the invention is to provide an improved cathead, or rotatable drum assembly, which may be mounted on the derrick floor as a separate unit, or which may be associated with the draw works, and which is constructed so as to efficiently handle all of the necessary work, such as making and breaking joints, handling tongs, etc.

An important object of the invention is to provide a device including a rotatable element having an improved clutch mechanism associated therewith, whereby the rotation of the element may be quickly and positively controlled with no danger of injury to the operator and with a minimum effort on the part of said operator.

A particular object of the invention is to provide an improved device, of the character described, wherein the clutch disk or plate which establishes driving connection with the rotatable element is movable into and out of frictional engagement with said element by means of a rotatable worm screw, whereby maximum movement of the disk with minimum rotation of the worm may be had, and also whereby the worm screw acts as a locking means to prevent accidental disengagement of the disk from the element after these parts have been engaged.

A further object of the invention is to provide an improved device, of the character described, wherein two clutch elements are employed, one on each side of the rotatable cable drum, or other member, together with a single actuating means for engaging the clutch elements with the drum to set up a driving connection therebetween; the provision of the two elements producing a double clutching action to assure positive driving connection between said drum and said elements.

Still another object of the invention is to provide an improved cathead device having a rotatable cable spool arranged to be frictionally engaged by a clutch element so as to be driven thereby, the device including means for preventing lubricant in the bore of the drum from passing outwardly between the clutching faces and interfering with the clutching action.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a cathead, constructed in accordance with the invention, Figure 2 is an enlarged longitudinal, sectional view, taken on the line 2—2 of Figure 1, and showing the clutch mechanism in a disengaged position, Figure 3 is a partial view, showing the clutch mechanism in an engaged position, Figure 4 is a transverse, vertical, sectional view taken on the line 4—4 of Figure 2, Figure 5 is a view, partly in elevation and partly in section, and showing the worm screw, with the movable collar within which said screw is threaded, Figure 6 is an end elevation of one of the clutch plates, Figure 7 is a plan view of a modified form of the invention, Figure 8 is a longitudinal, sectional view of this form, showing the clutch mechanism in a disengaged position in full lines, Figure 9 is a transverse, vertical, sectional view taken on the line 9—9 of Figure 8, Figure 10 is a view, partly in elevation and partly in section, and showing the drive pulley and clutch disk assembly, and Figure 11 is a view, partly in elevation and partly in section, showing the worm screw which is mounted on the rotatable shaft and also showing the movable collar which coacts with said worm screw.

In the drawings, the numeral 10 designates an elongate shaft which is provided with an externally screw-threaded pin 11 at one end thereof. The shaft 10 is arranged to be coupled to a drive shaft 12, which is driven by any suitable means (not shown), whereby the shaft 10 is constantly rotated so long as the shaft 12 is rotating. The coupling between the shaft 10 and the shaft 12 is clearly shown in Figures 2 and 4 and this coupling includes a circular plate 13 which is provided with an axial screw-threaded opening 14, within which the pin 11 of the shaft 10 is threaded. The plate 13 is arranged to abut the end of the drive shaft 12 and its peripheral portion extends beyond the outer surface of said drive shaft. A split coupling collar 15 is adapted to encircle the end of the drive shaft 12 and has one end abutting the extended portion of the plate 13. This end of the split coupling collar is secured to said plate by means of bolts 16. The opposite end of the collar 15 is formed with an inwardly directed flange 17 which engages within an annular groove 18 provided in the outer surface of the shaft 12. Manifestly, the screws 16 tend to hold the two sections of the split coupling collar 15 together, but to further fasten these parts to each other a pair of suitable bolts 19 (Figure 4) pass through the meeting faces of the section of said collar. A radially extending pin 20 is provided with a head 21 which fits within a recess 22 formed in the outer surface of the drive shaft 12. The outer end of the pin is arranged to engage an opening 23 in the split coupling collar 15 and said pin serves to connect the shaft with the coupling, whereby said coupling rotates therewith.

When the drive shaft 12 is rotated, the coupling 15 is rotated therewith and since the plate 13, which forms a part of the coupling, is connected to the shaft 10 through the screw threads 11, the shaft 10 is also rotated. The engagement of the inwardly directed flange 17 on the coupling 15 within the annular groove 18 of the shaft 12 holds the plate 13 and the end of the pin 11 in abutting relation with the end of said shaft 12. When it is desired to disconnect the shafts 10 and 12, it is only necessary to remove the bolts 16 and the bolts 19, which permit the sections of the coupling 15 to be removed from around the shaft 12. As soon as this is done, the shafts 10 and 12 may be separated.

The opposite end of the shaft 10 is formed with an enlarged clutch plate or disk 24, which is preferably made integral with said shaft. Beyond the disk, the shaft is extended and this extended portion is journaled in a bearing collar 25 which is supported by an upright standard 25', whereby the outer end of the shaft 10 is suitably supported. The central portion of the clutch disk or plate 24 is hollowed out to form an annular chamber 26 and this chamber is arranged to receive a suitable lubricant. Inclined ports or openings 27 extend outwardly from the chamber 26 to the exterior of the clutch plate and the purpose of these ports will be hereinafter explained. The inner surface of the clutch disk or plate has a suitable clutching material 28 secured thereto.

A cable drum or spool 29 is mounted on the shaft 10 and is freely rotatable thereon. This spool or drum may be of any desired size and has a cable or line 30 wound therearound. One end of the cable is secured to the drum and has been illustrated as fastened in a recess 31 provided in the drum (Figure 2), whereby the cable cannot be detached from the drum. The free end of the cable or line is utilized to perform the making and breaking of pipe joints, or other work on the derrick floor.

A second clutch disk or plate 32, similar in construction to the plate 24, surrounds the shaft 10 and is arranged to engage the opposite end of the drum or spool 29. The inner face of this disk has a suitable clutching material 33 secured thereto. The clutch disk 32 is formed with an integral collar 34, which collar is secured to the shaft by a key 35. The key is engageable with a longitudinal slot 36 provided in the bore of the collar 34. With this arrangement, the clutch disk 32 is rotatable with the shaft 10 at all times, but due to the engagement of the key 35 within the slot 36, said clutch disk is movable longitudinally of the shaft. The clutch disk 32 is formed with the internal annular chamber 26, similar to the chamber 26 in the clutch plate 24 and is also provided with the inclined outlet 27. The clutch plates or disks 24 and 32 have substantially the same diameter as the ends of the cable drum or spool 29 and, obviously, when the plate 32 is moved longitudinally of the shaft and into engagement with the end of the drum, said drum is confined between the plate 32 and the other clutch plate 24. When so confined, a rotation of the shaft will rotate the disk 32, with the result that the drum or spool 29 is also rotated. The direction of rotation of the shaft 10 is always the same and is in a direction to wind the cable 30 around the drum. When the clutch 32 is disengaged from the end of the drum, said drum, being freely rotatable on the shaft 10, is halted in its rotation. It is pointed out that the movement of the clutch disk 32 is relatively small since the space between its clutch face 33 and the end of the drum is slight. In this manner, it is only necessary to move the disk 32 a relatively small distance in order to set up a clutching engagement with the drum.

For imparting a longitudinal movement to the clutch plate 32 in order to engage and disengage said plate from the drum 29, a worm screw element 37 surrounds the shaft 10, being freely rotatable thereon. The element 37 is formed with coarse thread 38 and also provided with an enlarged flange or head 39, to which an operating handle 40 is attached. The flange or head 39 of the element 37 is located adjacent the circular disk or plate 13 of the coupling collar 15 and a suitable thrust bearing 41 is interposed between the head and the plate. Said plate and said head may be recessed to receive the bearing assembly 41, as is shown in Figure 2.

The coarse threads 38 of the worm screw element 37 are threaded into the bore 42 of a thrust collar 43. This thrust collar is mounted within a fixed collar 44 carried by a standard 45 and is held against rotation within said fixed collar by set screws 46. The set screws pass through the collar 44 and engage longitudinal grooves 47 formed in the exterior of the thrust collar 43. With this arrangement, the set screws prevent rotation of the thrust collar but permit a longitudinal movement within the fixed support 44. It is pointed out that the head 39 of the worm screw element 37 is confined between the bearing assembly 41 and the fixed support 44, whereby said element cannot undergo a longitudinal movement on the shaft, although it is capable of rotation thereon.

The bore 42 of the thrust collar 43 is enlarged, as shown at 48, whereby an internal annular shoulder 49 is formed within one end of said thrust collar. A thrust bearing assembly 50 is confined within the enlarged portion 48 of the bore of the collar 43 and this assembly has one side abutting the shoulder 49. The other side of the bearing assembly engages the ends of the collar 34 which is made integral with the clutch disk 32 and, therefore, any longitudinal movement of the thrust collar 43 will impart a similar movement to the clutch disk 32.

In the operation of the device, with the parts in an unclutched position, as shown in Figure 2, the drum or spool 29 is freely rotatable on the shaft 10 and the operator may grasp the free end of the cable 30 and unwind the same from the drum. At this time, it will be assumed that the drive shaft 12 is rotating, as is the shaft 10 which is coupled thereto. When it is desired to rotate the drum 29 so as to wind the cable 30 therearound, and perform any given operation, it is only necessary to grasp the handle 40 of the worm screw element 37 and by means of this handle rotate said worm screw. As has been pointed out, the element 37 is confined against any longitudinal movement on the shaft and, therefore, as the same is rotated, the coarse threads 38 thereof engaging in the threads formed in the bore of the thrust collar 43, imparts a longitudinal movement to said thrust collar. Since the threads are relatively coarse, only a partial revolution of the worm screw element 37 is necessary to obtain a relatively long movement of the collar 43. As the collar 43 moves longitudinally of the shaft within the fixed support 44, said collar bearing against the collar 34 of the clutch disk 32 through the thrust bearing assembly 50, moves said collar and clutch disk 32 into engagement with the end of the drum or spool 29. When the clutch disk 32 engages the drum, said drum is forced into engagement with the opposite clutch disk 24 and is, therefore, confined between the two clutching elements 24 and 32. Since the element 32 is keyed on the shaft 10 which is rotating, it will be manifest that a rotation will be imparted to the drum through the frictional engagement of the clutching faces 28 and 33 with the ends of said drum. The direction of rotation of the shaft and clutch disks 32 and 24, as has been pointed out, is in a direction to wind the cable 30 around the drum. The lubricant which is utilized to lubricate the shaft 10 will enter the chambers 26 in the clutching elements 24 and 32 and any excess lubricant will be thrown through the inclined ports 27 instead of being thrown out between the engaging faces of the clutch disks and the end of the spool. It is noted that if the lubricant contacted these faces, it might interfere with the frictional engagement between the clutching elements and the drum.

When it is desired to disengage the drum 29 from the clutching elements, it is only necessary to rotate the worm screw element 37 in an opposite direction. Such rotation will cause a retraction of the thrust collar 43 with relation to the clutch disk 32, with the result that said disk may move away from the drum 29. As soon as the disk 32 disengages the drum 29, said drum will also move a slight distance away from the opposite disk 24, whereby the frictional engagement between this latter disk and the drum is no longer had. Therefore, as soon as the pressure against the disk 32 is relieved, the driving connection with the drum is relieved and said drum is again freely rotatable independently of the shaft 10.

It is pointed out that the provision of the worm screw and the movable collar 43 provides a quick and effective means of making and breaking the clutching engagement. Although the threads 38 of the worm screw are relatively coarse, their pitch is sufficiently steep to prevent a reverse operation of said worm screw and, therefore, when the clutch disks are in their engaged position, said worm screw acts as a locking means to prevent accidental disengagement of the clutching mechanism. Also, the provision of the worm screw provides a positive means of applying sufficient pressure to set up the desired frictional engagement between the clutching faces and the drum. It is pointed out that although a manually operable handle 40 has been shown as a means for rotating the worm screw element, any desired means for rotating this element may be employed, as for example, a foot lever could be provided.

In Figures 7 to 11, a modified form of the invention is shown. In this form, an elongate operating shaft 51 is provided. A drive pulley 52, which may be rotated by a suitable belt 53, is mounted on the shaft 51 and is freely rotatable thereon. This pulley is provided with an integral elongate sleeve 54, which sleeve has the shaft 51 extending therethrough. A clutch disk or plate 55 is also made integral with the sleeve 54 and is provided with clutching material 56 on its inner face. As is clearly shown in Figures 8 and 10, the clutch disk or plate 55 is spaced from the pulley 52. The sleeve 54 extends through a bearing collar or support 57, which support is split, the sections thereof being fastened together by bolts 58 (Figure 9). The bearing collar or support is carried by a standard 59 which extends upwardly from a supporting base 60. As is clearly shown in Figure 8, the bearing collar is located between the drive pulley 52 and the clutch plate 55 and serves to support the sleeve 54 and shaft 51.

One end of the shaft 51 is formed with an external annular flange 61, which flange is located on the outer side of the drive pulley 52. A suitable thrust bearing assembly 62 is confined between the flange 61 and said pulley and, beyond the flange, the shaft is extended and has an operating handle 63 secured thereto. By grasping the handle, the operator may freely rotate the shaft 51 within the sleeve 54.

The opposite end of the shaft 51 is formed with a worm screw 64, which screw is threaded within a thrust collar 65. The collar 65 is mounted within a support 66 and is held against rotation therein by a set screw 67. The support is carried by a standard 68 which extends upwardly from the base 60. Since the thrust collar 65 is held stationary within its fixed support, it will be manifest that a rotation of the shaft 51 will cause said shaft to move longitudinally of said collar due to the worm screw 64 being threaded within said collar. A longitudinal movement of the shaft 51 will cause the external flange 61, which is made integral therewith, to apply a pressure against the pulley 52 and against the sleeve 54 and clutch plate 55 made integral with said pulley. Rotation of the shaft 51 in an opposite direction will cause the flange 61 to move away from the pulley 52 and thereby relieve the pressure thereagainst.

A cable drum or spool surrounds the sleeve 54 beyond the clutch plate or disk 55 and said drum is freely rotatable on the sleeve. One end of the drum is adjacent to the clutch face 56 of the clutch element 55, while the other end of said drum is adjacent the thrust collar 65. A suitable thrust bearing assembly 70 is interposed between the end of the drum 69 and the thrust collar 65. The cable 30 has one end attached in any suitable manner to the drum 69 and said cable is adapted to be wound around said drum.

In the operation of this form, it will be manifest that the pulley 52 is rotated by means of the belt 53 and rotation of this pulley imparts a rotation to the sleeve 54 and clutch disk or plate secured thereto. When the clutch plate 55 is in its disengaged position, as shown in full lines in Figure 8, it will be manifest that the pulley and clutch, as well as the sleeve 54, will rotate on the shaft 51. When it is desired to engage the clutch face 56 with the end of the drum 69, it is only necessary to rotate the shaft 51 and rotation of this shaft will cause a longitudinal movement of said shaft due to the worm screw 64 which is threaded through the stationary thrust collar 65. As the shaft is rotated and moved through the collar 65, the flange 61 on said shaft, bearing against the pulley 52 through the thrust bearing 62, will impart a longitudinal movement to said pulley. Since the pulley is made integral with the sleeve 54, as well as with the clutch plate 55, these latter two parts will be moved therewith. Such movement of the clutch plate 55 causes its clutching face 56 to engage the end of the drum 69, which has its opposite end engaging the stationary thrust collar 65, whereby said drum is confined between said collar and the clutch disk. As soon as this occurs, a frictional engagement between the clutch disk and the drum sets up a driving connection between the pulley 52 and said drum to rotate the latter.

When it is desired to disengage the clutch disk 55, it is only necessary to rotate the shaft 51, whereby the worm screw 64 will reverse its travel through the stationary thrust collar 65. Such movement of the shaft 51 relieves the pressure against the end of the pulley 52, whereby the clutch disk or plate 55 may move away from the drum 69 and disconnect said drum from the driving means. It is noted that the worm screw 64 and the collar 65 act in the same manner as the worm screw element 37 and thrust collar 43, which has been described in the first form, whereby a locking of the clutch plate in its engaged position is had.

The improved clutching mechanism has been illustrated and described for actuating the rotatable cable drum of a cathead apparatus but it is pointed out that said mechanism may be readily employed for connecting and disconnecting a drive means with any rotatable element. For example, the rotatable element could be a drive gear instead of a cable drum and, manifestly, the clutching mechanism would control the rotation thereof. Thus, the invention is not to be limited to its use with a cathead, since it may be employed elsewhere.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A cathead including, a rotatable shaft, a clutch disk secured to one end of the shaft and incapable of longitudinal movement, a cable drum freely rotatable on the shaft and having one end adjacent the clutch disk, a second clutch disk keyed on the shaft and capable of longitudinal movement thereon and arranged to be moved into engagement with the opposite end of the drum, whereby said drum is confined between the disks and has frictional engagement therewith so as to be driven thereby, a non-rotatable thrust collar surrounding the shaft being movable longitudinally thereof and having its end arranged to abut and engage the movable clutch disk whereby when the collar is moved said disk is moved therewith, a fixed support within which the collar is keyed and rotatable means on the shaft and engaging within the bore of the thrust collar for imparting movement to the collar.

2. A cathead including, a rotatable shaft, a clutch disk secured to one end of the shaft and incapable of longitudinal movement, a cable drum freely rotatable on the shaft and having one end adjacent the clutch disk, a second clutch disk keyed on the shaft and capable of longitudinal movement thereon and arranged to be moved into engagement with the opposite end of the drum, whereby said drum is confined between the disks and has frictional engagement therewith so as to be driven thereby, a non-rotatable thrust collar surrounding the shaft being movable longitudinally thereof and having its end arranged to abut and engage the movable clutch disk whereby when the collar is moved said disk is moved therewith, a fixed support within which the collar is keyed to undergo longitudinal movement and a rotatable worm screw element threaded within the collar and confined against longitudinal movement, whereby rotation of the element imparts movement to the collar and thereby controls the clutching action.

3. A cathead including, a rotatable shaft, a clutch disk secured to one end of the shaft and incapable of longitudinal movement, a cable drum freely rotatable on the shaft and having one end adjacent the clutch disk, a second clutch disk keyed on the shaft and capable of longitudinal movement thereon and arranged to be moved into engagement with the opposite end of the drum, whereby said drum is confined between the disks and has frictional engagement therewith so as to be driven thereby, an annular fixed support mounted adjacent the movable clutch disk and surrounding the shaft, a thrust collar also surrounding the shaft and slidably keyed within the support so as to be movable longitudinally on the shaft, said collar being free from positive connection with the clutch disk and arranged to engage the movable clutch disk, whereby the collar may be utilized to move the disk into engagement with the drum, and a rotatable operating member confined against movement on the shaft and interposed between said shaft and the collar, said member and collar having co-acting worm teeth, whereby rotation of the member will impart movement to the collar.

ARTHUR L. RODGERS.